US006204577B1

United States Patent
Chottiner et al.

(10) Patent No.: US 6,204,577 B1
(45) Date of Patent: Mar. 20, 2001

(54) METHOD AND APPARATUS FOR SPACE-SAVING INSTALLATION OF A STARTER-ALTERNATOR

(76) Inventors: Jeffrey Eliot Chottiner, 39548 N. Valley Ct., #203 Farmington Hills, MI (US) 48335; Jon Barry Joachim, 560 Fort Dearborn St., Dearborn, MI (US) 48124; Michael Benjamin, 3212 Dunwoodie Rd., Ann Arbor, MI (US) 48105

( * ) Notice: Subject to any disclaimer, the term of this patent is extended or adjusted under 35 U.S.C. 154(b) by 0 days.

(21) Appl. No.: 09/477,885

(22) Filed: Jan. 5, 2000

(51) Int. Cl.⁷ .................... H02K 15/00; H02K 15/16
(52) U.S. Cl. .................... 310/42; 310/91; 310/90; 310/67 R; 29/596
(58) Field of Search .................... 310/91, 42, 79, 310/90; 36/67 R; 29/596

(56) References Cited

U.S. PATENT DOCUMENTS

| Re. 31,947 | * | 7/1985 | Farr | 310/74 |
|---|---|---|---|---|
| 3,394,276 | | 7/1968 | Cafici | 310/67 |
| 3,500,091 | | 3/1970 | Jones | 310/168 |
| 4,021,690 | * | 5/1977 | Burton | 310/67 R |
| 4,203,710 | * | 5/1980 | Farr | 310/74 |
| 4,554,472 | | 11/1985 | Kumatani | 310/62 |
| 4,841,187 | | 6/1989 | Hauke et al. | 310/171 |
| 4,862,009 | | 8/1989 | King | 290/22 |
| 4,958,095 | * | 9/1990 | Uchida et al. | 310/59 |
| 5,001,412 | | 3/1991 | Carter et al. | 322/10 |
| 5,047,677 | | 9/1991 | Mineta et al. | 310/67 R |
| 5,163,528 | | 11/1992 | Kawamoto et al. | 180/65.5 |
| 5,581,136 | | 12/1996 | Li | 310/67 R |
| 5,751,084 | | 5/1998 | Park | 310/90 |
| 5,952,746 | * | 9/1999 | Mittmann et al. | 310/42 |

FOREIGN PATENT DOCUMENTS

| 63-198551 | 8/1988 | (JP) | H02K/5/14 |
|---|---|---|---|
| 63-198553 | 8/1988 | (JP) | H02K/5/14 |
| 4-168961 | 6/1992 | (JP) | H02K/21/22 |

* cited by examiner

*Primary Examiner*—Burton Mullins
(74) *Attorney, Agent, or Firm*—Ford Global Technologies, Inc.

(57) ABSTRACT

An installation and support apparatus or assembly 18 is provided for use in combination with an electric machine 10, such as a starter-alternator, which is adapted to be operatively installed between the engine block 12 and the transmission assembly 16 of a vehicle. The apparatus 18 includes a stationary support member 20, an generally circular seal member 22, and an outer or rotor engaging bearing 24. Member 20 cooperates with bearing assembly 24 to automatically create or form a relatively precise and uniform gap 54 between the stator assembly 26 and the rotor assembly 30 of electric machine 10.

18 Claims, 3 Drawing Sheets

METHOD AND APPARATUS FOR SPACE-SAVING INSTALLATION OF A STARTER-ALTERNATOR

FIELD OF THE INVENTION

This invention relates to a method and an apparatus for space-saving installation of a starter-alternator, and more particularly, to a method and an apparatus for space-saving installation of a starter-alternator within a vehicle which automatically and precisely aligns the starter-alternator, and which provides an integral seal to substantially prevent the leakage of oil and/or lubricant from the vehicle's engine.

BACKGROUND OF THE INVENTION

Starter-alternators are electric machines which function as both motors and generators, and are employed within vehicles to provide electrical power and torque. Particularly, starter-alternators are typically used within hybrid-electric type vehicles, and provide a variety of functions and benefits, including but not limited to generating and providing electrical power to vehicle systems and components; starting the vehicle's engine; providing additional torque to the vehicle's engine during heavy accelerations; assisting in and/or performing the braking functions of the vehicle, thereby capturing the kinetic energy of the moving vehicle; and stopping or "shutting off" the vehicle's engine during idling and decelerating states or conditions, thereby improving the overall fuel economy of the vehicle.

Starter-alternators are typically and operatively disposed in the space or area normally occupied by a flywheel an d a clutch, in the case of manual transmission type vehicles, or by a torque converter, in the case of automatic transmission type vehicles. Starter-alternators generally include a stator, which is fixedly coupled to the vehicle's engine block, and a rotor which is coupled to the vehicle's crankshaft, and which is rotatably disposed within the stator. Particularly, the rotor is concentrically disposed with respect to the stator, and is separated from the stator by a relatively uniform, precise and minute gap or space, across which magnetic flux generated by the two assemblies traverses or travels.

One drawback associated with these starter-alternators is that the relatively uniform, precise and minute gap between the stator and the rotor is relatively difficult to create and/or form during the installation and/or assembly procedures. Another drawback associated with these starter-alternators is that they do not accommodate or compensate for axial loads which are generated by internal combustion forces of the engine, which are transferred to the electric machines by way of the crankshaft. These axial loads cause undesirable stress and/or wear to the crankshaft and to the components of the electrical machine. Additionally, oil and/or lubricant, which is contained within the engine block, may leak outside of the engine block and into the space or area occupied by the starter-alternator, thereby undesirably contacting components and/or portions of the starter-alternator.

Attempts have been made to maintain the precision and uniformity of the relatively small gap between the stator and the rotor, to reduce the axial loads imparted on the crankshaft, and to prevent the leakage of oil and/or lubricant from the engine block. For example and without limitation, attempts have been made to manually align and/or center the rotor and the stator during the installation procedure, by the use of manual alignment tools or devices. However, these types of manual alignment procedures are undesirably time-consuming and tedious. Additionally, such alignment procedures do not significantly reduce the axial loads transferred to the crankshaft by the substantially unsupported rotor. Other attempts have been made to tighten the specifications and/or tolerances of the components of the starter-alternator and/or of the crankshaft. These prior attempts have undesirably and significantly increased the overall cost of the assembly, and have not provided substantial improvement in maintaining the small and uniform gap, in reducing the stress imparted on the crankshaft, or in reducing the space required for oil retaining components.

There is therefore a need for a new and improved method and apparatus for installing a starter-alternator within a vehicle which overcomes many, if not all, of the previously delineated drawbacks of such prior methods and devices.

SUMMARY OF THE INVENTION

It is a first object of the invention to provide a method and an apparatus for installing a starter-alternator within a vehicle which overcomes at least some of the previously delineated drawbacks of prior devices, apparatuses, and methodologies.

It is a second object of the invention to provide a method and an apparatus for installing a starter-alternator within a vehicle which automatically and precisely aligns the rotor assembly and the stator assembly, thereby eliminating the need for tedious manual alignment procedures.

It is a third object of the invention to provide a method and an apparatus for installing a starter-alternator within a vehicle which substantially reduces and/or absorbs axial loads generated by the rotor assembly.

It is a fourth object of the invention to provide a method and an apparatus for installing a starter-alternator within a vehicle which substantially prevents oil and/or lubricant from leaking into t he starter-alternator from the vehicle's engine block.

It i s a fifth object of the invention to provide a method and an apparatus for installing a starter-alternator within a vehicle, which integrates oil retaining components, thereby reducing the overall space required for installation.

According to a first aspect of the present invention, an apparatus for use in combination with an assembly is provided. The assembly is of the type having an engine block and a crankshaft which extends from the engine block. The assembly also includes a rotor assembly having a hub, and a stator assembly which operatively contains said rotor assembly. The apparatus includes: a support member which is fixedly coupled to the engine block, the support member including an outer annular surface upon which the stator assembly is fixedly secured and an inner annular surface; a piloting portion, which integrally formed with the hub, and which is adapted to engage the crankshaft, the engagement being effective to axially align the rotor assembly with the crankshaft; and a bearing assembly, which is coupled to the inner annular surface of the support member and which abuttingly engages the hub, the abutting engagement being effective to center the support member and the stator assembly with respect to the rotor assembly, thereby aligning the rotor assembly within the stator assembly.

According to a second aspect of the present invention, a method for installing a electric machine within a vehicle is provided. The vehicle is of the type having an engine block and a crankshaft having an end portion which extends from the engine block, the electric machine including a stator assembly and a rotor assembly which is adapted to be separated from the stator assembly by a certain gap. The method includes the steps of:

providing a support member having a centrally disposed channel; coupling the stator assembly to the support member; providing a bearing assembly; coupling the bearing assembly to the support member and within the channel; axially aligning the channel of the support member with the end portion of the crankshaft; moving the support member from a first position in which the support member is remote from the engine block and a second position in which the support member abuts the engine block; relatively loosely coupling the support member to the engine block; peripherally disposing the rotor assembly upon a hub member; disposing an pilot upon the hub member, the pilot being effective to abuttingly engage the end portion of the crankshaft; axially aligning the hub member with the end portion of the crankshaft; and moving the hub member from a first position in which the hub member is remote from the end portion of the crankshaft and a second position in which the pilot engages the end portion of the crankshaft, the movement being effective to cause the bearing assembly to engage the hub member, thereby automatically causing the stator assembly to be aligned with the rotor assembly and forming the certain gap.

These and other features, aspects, and advantages of the invention will become apparent by reading the following specification and by reference to the following drawings.

DETAILED DESCRIPTION OF THE PREFERRED EMBODIMENT OF THE INVENTION

Figure 3:
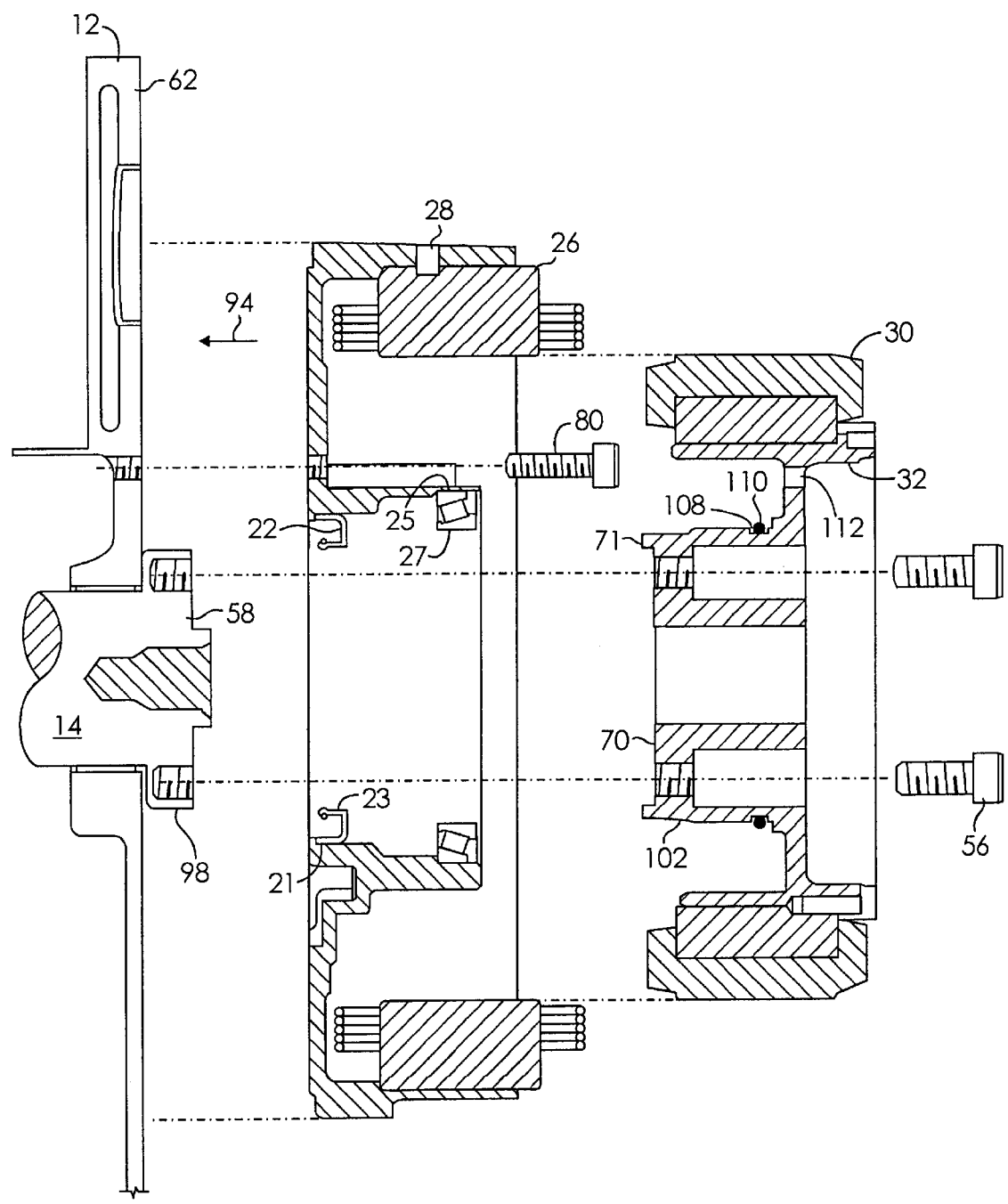
FIG. 3 is an exploded sectional view of the starter-alternator assembly shown in FIG. 1.

Referring now to FIG. 3, there is shown an electric machine or assembly 10 which has been installed within a vehicle, in accordance with the teachings of the preferred embodiment of the present invention. Particularly, assembly 10 has been installed within a vehicle of the type having a engine block 12, a crankshaft 14, which is conventionally, operatively, and rotatably disposed within the engine block 12, and a transmission assembly 16. In the preferred embodiment of the present invention, assembly 10 is operatively installed between the engine block 12 and the vehicle's transmission assembly 16. Assembly 10 has been coupled to and/or installed within the vehicle by way of a novel installation and support apparatus or assembly 18, which includes a stationary support member 20, a generally circular seal member 22, and a rotor engaging bearing assembly 24. Assembly 10 and apparatus 18 are operatively disposed within a "bell-shaped" housing 60 which is conventionally and fixedly coupled to wall or portion 62 of engine block 12. While the following discussion describes the use of apparatus 18 in combination with a vehicle, it should be appreciated that apparatus 18 may be operatively deployed upon and/or used in combination with any type of device or assembly in which an electric machine is operatively coupled to the crankshaft of an engine.

In the preferred embodiment of the invention, assembly 10 is a conventional starter-alternator or motor-generator, and includes a stator assembly 26, which is conventionally, fixedly, and pressingly mounted to apparatus 18 by way of a plurality of substantially identical pins or rods 28, and a rotor assembly 30, which is rotatable with respect to stator assembly 26, and is fixedly connected to crankshaft 14, by way of a hub 32. While the following description is made with reference to a starter-alternator, it should be appreciated that the novel installation method and apparatus described herein may be used in combination with any other type of electric machine.

Stator assembly 26 includes a generally ring-shaped core member 34 and a winding 36, which is conventionally wrapped around and/or within core member 34. In the preferred embodiment of the invention, winding 36 is a conventional multi-phase, which gives rise to a conventional multi-phase alternating current. Stator assembly 26 has an inner annular surface 42 having a diameter 38, and an outer annular surface 44 having a diameter 40.

Rotor 30 includes a plurality of peripherally disposed poles or pole pieces 46, and a conducting material 48, such as aluminum, which is peripherally disposed and/or formed around and in between poles 46, thereby interconnecting poles 46. Rotor 30 has a generally cylindrical outer annular surface 50 having a diameter 52 which is slightly smaller than diameter 38 of stator assembly 26, and which is separated from the inner annular surface 42 of stator 26 by a relatively small and uniform distance or gap 54. In the one non-limiting embodiment of the invention, gap 54 is less than four tenths of a millimeter (0.4 mm) in length. As described more fully and completely below, this precise gap 54 is formed by support assembly 18 without tightening the machining tolerance on the components of the electric machine 10. It should be appreciated that this small, precise, and uniform gap 54 improves the overall electrical efficiency of the electric machine 10.

Hub 32 includes a generally cylindrical and integrally formed outer annular lip or ridge portion 68, on which poles 46 and material 48 are fixedly and circumferentially coupled, and an integrally formed inner crankshaft connecting portion 70. Portion 70 includes an integrally and peripherally formed ridge 71 which axially or longitudinally projects from portion 70. Ridge 71 includes an inner "piloting" diameter or an inner annular surface 73, which abuttingly engages and/or mates with the outer piloting diameter or outer annular surface 98 of end portion 58 of crankshaft 14. Portion 70 is fixedly connected to end portion 58 in a conventional manner, such as by a plurality of conventional bolt-type fasteners 56.

In one non-limiting embodiment, hub 32 is made from an aluminum material, having relatively high thermal expansion characteristics. In this non-limiting embodiment, hub 32 is given a smaller diameter, thereby creating or forming a small "clearance" or gap between the outer surface 102 of portion 70 and the inner race 27 of bearing 24. During operating hub 32 expands, thereby closing the small gap and allowing hub 32 to operatively engage the inner race 27 of bearing assembly 24.

The wall 62 of engine block 12 includes an integrally formed and generally circular aperture 74, through which end portion 58 of crankshaft 14 extends. A conventional rear bearing assembly 76 (e.g., a sliding bearing assembly) is operatively housed within aperture 74 and rotatably engages crankshaft 14. Bearing assembly 76 cooperates with a plurality of substantially identical bearing assemblies (not shown), which are operatively disposed within engine block 12, to allow crankshaft 14 to rotate about its longitudinal axis 78, while concomitantly and substantially maintaining the position of axis 78 within aperture 74. Rear bearing assembly 76 allows some of the oil and/or lubricant contained within engine block 12 to traverse or pass through aperture 74.

Support member 20 is preferably manufactured from a relatively strong, durable and rigid material, such as steel or aluminum, and is fixedly coupled to wall 62 in a conventional manner, such as by a plurality of conventional bolts or fasteners 80. Member 20 is generally cylindrical and/or ring-shaped, and includes an integrally formed outer annular lip or ridge portion 82, an inner annular lip or ridge portion 84, and a centrally disposed aperture or channel 88. Outer lip portion 82 is fixedly coupled to and supports stator assembly 26. The inner surface 86 of portion 84 forms the generally circular aperture or channel 88, in which end portion 58 of crankshaft 14 and portion 70 of hub 32 are rotatably disposed.

In the preferred embodiment of the invention, seal member 22 is a generally circular or ring shaped conventional oil seal, and includes an outer lip or portion 21, and an inner lip or portion 23. In one non-limiting embodiment, seal 22 is manufactured from a conventional and commercially available plastic or rubber material. The outer lip 21 of seal 22 is preferably press-fit, or otherwise conventionally and fixedly coupled to the inner annular surface 86 of portion 84 of member 20. The inner lip or portion 23 of seal 22, pressingly and abuttingly engages and/or mates with end portion 58 of crankshaft 14, and more particularly, mates with the outer diameter or outer annular surface 98 of portion 58. Inner lip portion 23 is substantially smooth and has a relatively low coefficient of friction and thus, does not substantially encumber or hinder the rotation of crankshaft 14 with respect to member 20. Seal 22 operatively "blocks" and/or substantially prevents the oil and/or lubricant passing or flowing through aperture 74 from passing into the channel 72, which is formed between portion 70 of hub 32 and surface 86 of member 20, and from escaping into and/or contacting other portions or components of assembly 10. In one non-limiting embodiment, wall 62 includes a drain back passage which allows the oil retained by seal 22 to drain back into engine block 12.

In the preferred embodiment of the invention, bearing assembly 24 is a conventional tapered roller bearing assembly, which is adapted to absorb axial-type loads. In one non-limiting embodiment, assembly 24 may comprises a pair of adjacent tapered roller bearing assemblies adapted to absorb loads in substantially all axial directions. In other alternate embodiments, bearing assembly 24 may comprise any type or number of axial and radial load absorbing bearing assemblies adapted to absorb loads in substantially all axial and radial directions. In one non-limiting embodiment, assembly 24 is a non-axial load absorbing bearing, and a separate thrust bearing or other axial load absorbing device is provided elsewhere in engine block 12 or assembly 10.

Bearing assembly 24 is operatively disposed between member 20 and portion 70 of hub 32. Particularly, the outer surface or race 25 of assembly 24 is preferably press-fitted, or otherwise coupled to the inner annular surface 86 of member 20, and the inner race or surface 27 is frictionally and abuttingly engaged and/or mated with portion 70 by way of a conventional o-ring 110, which is disposed within an annular channel 108 that is integrally formed within the outer surface 102 of portion 70. The frictional engagement between o-ring 110 and the inner race 27 of bearing 24 ensures that the inner race 27 rotates with hub 32. Bearing assembly 24 concomitantly supports and/or maintains the rotating hub 32 and rotor 30 in their respective radial positions relative to engine crankshaft 14 and block 12, thereby substantially eliminating any radial deflection of rotor 30 and substantially maintaining or preserving the relatively small and uniform gap 54. In the preferred embodiment of the present invention, bearing assembly 24 is prelubricated and is "fully-sealed" in a conventional manner, such as by way of conventional radial lip seals or diaphragm seals.

The press-fitting of outer race 25 of bearing assembly 24 to the stationary member 20 is preferred over press-fitting the inner race 27 to portion 70 (e.g., only one of the inner or outer race of assembly 24 can be press-fitted during installation), due to the unbalanced loads and multi-directional forces imparted upon the bearing assembly 24, which are produced by crankshaft 14 bending under internal combustion and inertial forces. These unbalanced loads are transferred to the crankshaft end portion 58 and to bearing assembly 24. Particularly, it has been found that bearing assemblies, such as assembly 24 operate more efficiently when they are press-fitted to the stationary member (e.g., member 20), when the engaged rotating member (e.g., portions 58) produces an unbalanced and/or multi-directional load. In other alternate embodiments, bearing assembly 24 is not press-fit to surface 86, but is rather press-fit to portion 70 of hub 32.

Figure 1:
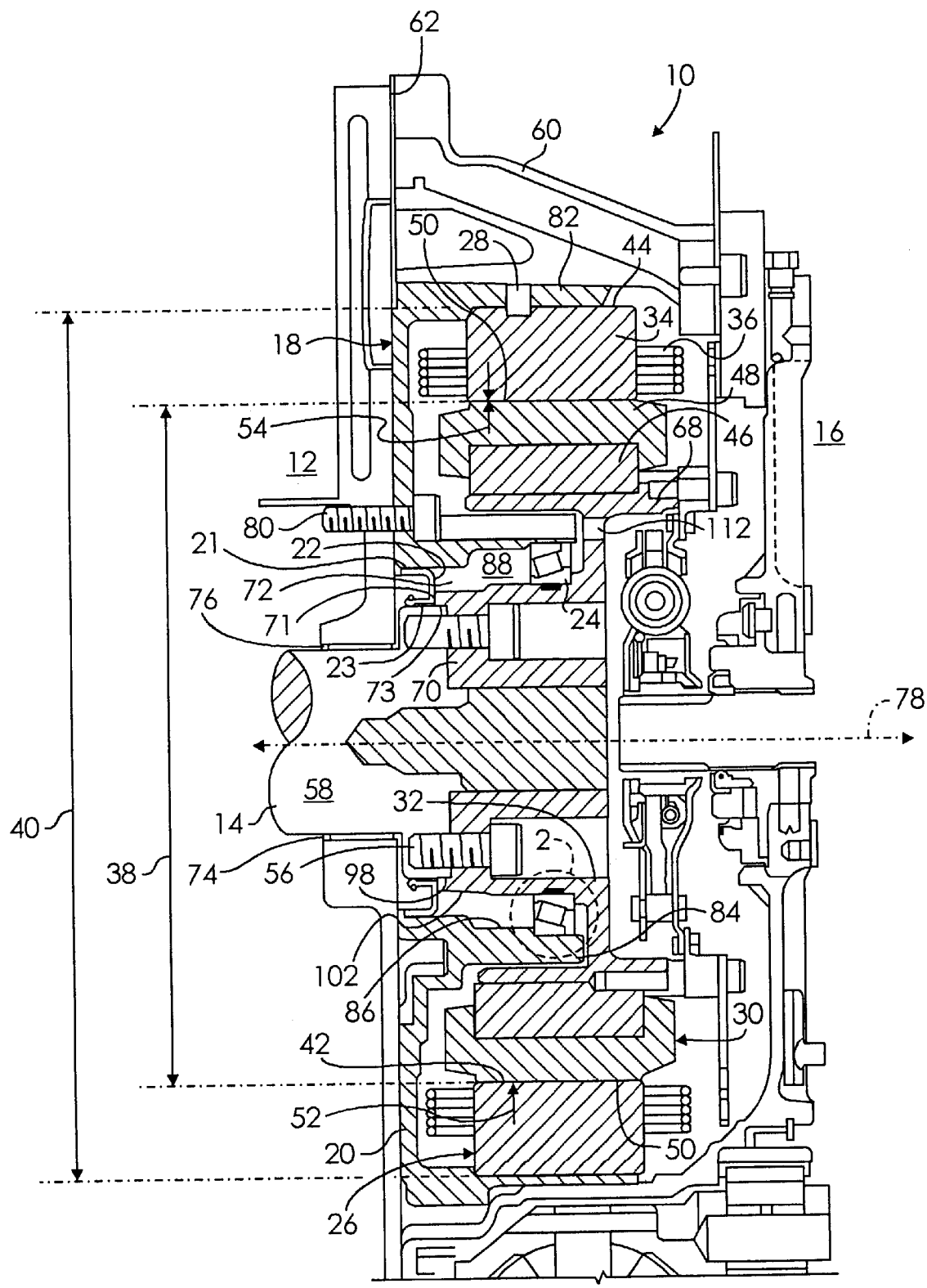
FIG. 1 is a sectional view of starter-alternator assembly which is aligned in accordance with the teachings of the preferred embodiment of the invention which is deployed within a vehicle.
Figure 2:
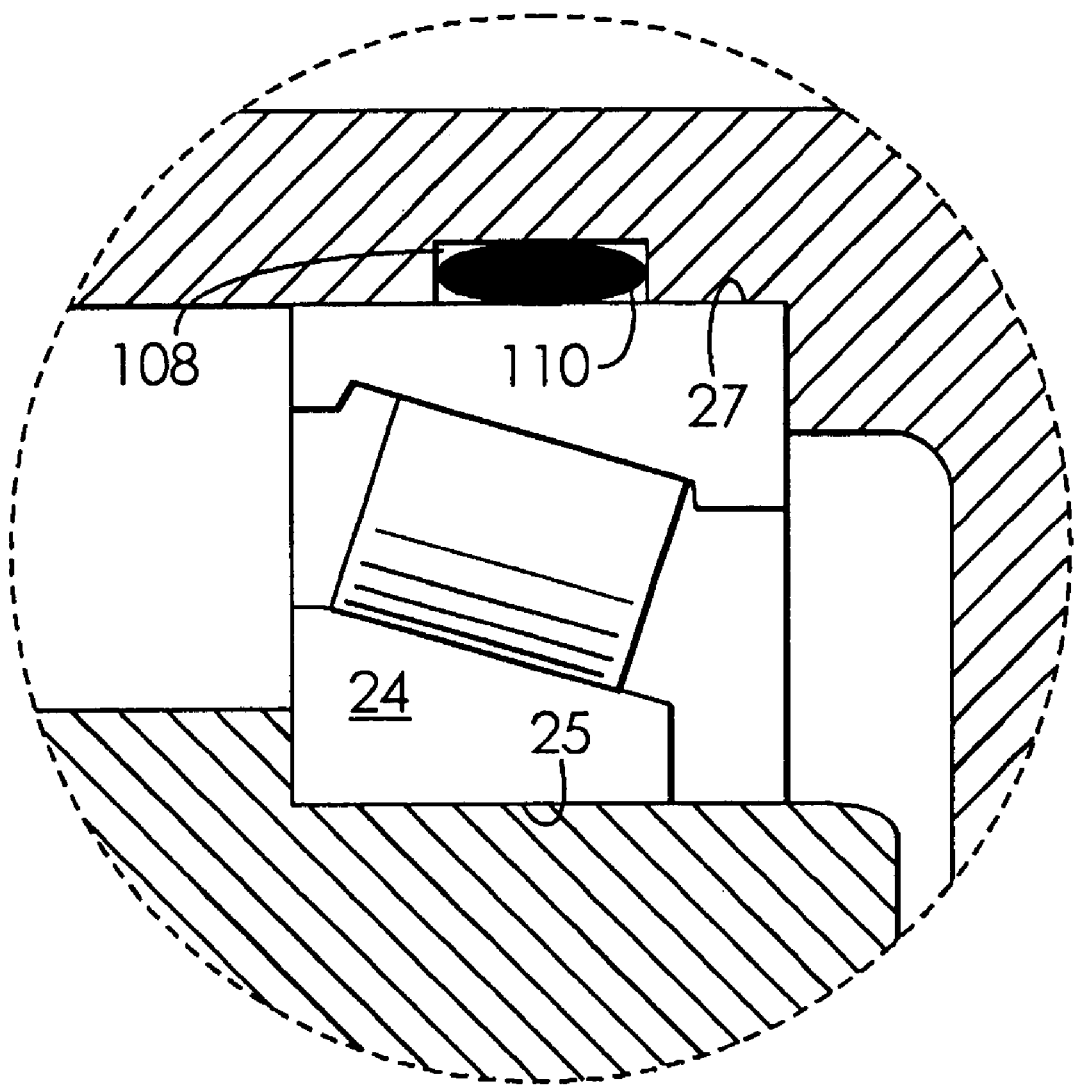
FIG. 2 is an enlarged view of the region "2" illustrated in FIG. 1.

The relatively minute and substantially uniform gap or distance 54 between stator 26 and rotor 30 is formed and substantially preserved or maintained, by way of the novel method of installing assembly 10 and the novel installation and support assembly 18. Particularly, assembly 10 is assembled and/or installed as follows. In the preferred embodiment of the invention, seal 22 and bearing assembly 24 are press-fitted or are otherwise convention ally and fixedly coupled to surface 86, as illustrated in FIG. 1. Stator assembly 26 is then fixedly coupled to member 20 by way of pins 28.

As best shown in FIG. 3, after seal 22, bearing assembly 24, and stator assembly 26 have been attached to member 20, member 20 is substantially and axially pre-aligned with the crankshaft 14, and is moved in the direction of arrow 94 into its operative position. More particularly, member 20 is moved in the direction of arrow 94 until it abuts wall 62 of engine block 12, as illustrated in FIG. 1. As member 20 is moved in the direction of arrow 94, the inner lip 23 of seal 22 pressingly and abuttingly engages the outer diameter or outer annular surface 98 of end portion 58, thereby forming a relatively tight annular seal between member 20 and end portion 58 and preventing oil and/or lubricant from passing into the subsequently formed channel 72. Once member 20 has been operatively positioned on wall 62, member 20 is relatively loosely attached or coupled to wall 62 by way of fasteners 80. In one non-limiting embodiment a conventional gasket member is placed between member 20 and wall 62 before member 20 is coupled to wall 62.

Once member 20 has been relatively loosely coupled to wall 62, rotor assembly 30 is substantially and axially pre-aligned and/or centered with respect to end portion 58 of crankshaft 14, and is moved in the direction of arrow 94 and into its operative position. More particularly, member 20 is moved in the direction of arrow 94, until the inner piloting diameter or surface 73 of hub 32 abuttingly engages and/or mates with the outer piloting diameter or surface 98 of end portion 58, as illustrated in FIG. 1. As hub 32 engages end portion 58, bearing assembly 24 concomitantly and abuttingly engages and/or mates with end portion 70 of hub 32, and more particularly, the inner race or inner annular surface 27 of bearing assembly 24 abuttingly engages the outer diameter or outer annular surface 102 of portion 70. In this manner, both rotor 30 and member 20 are automatically and concomitantly guided and/or piloted into their respective operative, aligned, and radially centered positions, thereby automatically and precisely forming the relatively small and uniform gap 54. Once hub 32 has been operatively positioned, fasteners 56 are used to tightly and/or securely fasten hub 32 to end portion 58. Fasteners 80 are then securely tightened or fastened, by inserting a conventional fastening tool through access hole 112, which is integrally formed within hub 32. In one non-limiting embodiment, a conventional alignment tool is used to axially align member 20 with crankshaft 14, before hub 32 is attached to end portion 58. In this alternate embodiment, an access hole 112, is not present within hub 32, and member 20 is tightly secured to wall 62 before hub 32 is coupled to end portion 58.

It should be appreciated that the presence of the bearing 24, which automatically pilots and/or centers both the "loosely-coupled" member 20 and the rotor assembly 30 into their operative, positions, substantially eliminates the need to manually align, reposition, and/or radially adjust rotor assembly 30 and/or member 20. It should further be appreciated that the components of installation assembly 18 (i.e., member 20 and bearings 22, 24) cooperate to allow both the stator assembly 26 and the rotor assembly 30 to be "referenced" to or aligned with the same pilot diameter or surface 98 of end 58 of crankshaft 14. In this manner, cooperative engagement between member 20, bearing assembly 24, stator assembly 26, rotor assembly 30 and crankshaft 14 ensures the highly precise alignment or formation of the relatively small and uniform gap 54 between stator assembly 26 and rotor assembly 30.

In operation, crankshaft 14 provides and/or receives torque to/from rotor assembly 30, thereby causing crankshaft 14 and/or rotor assembly 30 to rotate. Particularly, crankshaft 14 selectively provides torque and/or rotation to rotor assembly 30 through hub 32, thereby generating electrical power and/or voltage with winding 36. Additionally, electrical power may be conventionally and selectively supplied to or generated within winding 36, which generates a torque between stator assembly 26 and rotor assembly 30, thereby causing rotor assembly 30 to rotate and to assist in and/or cause the rotation of crankshaft 14. The installation and support assembly 18 ensures the efficient and unencumbered rotation and functional operation of crankshaft 14 and rotor assembly 30.

Importantly, the highly precise and uniform gap which is formed between stator assembly 26 and rotor assembly 30 prevents any contact from occurring between stator assembly 26 and rotor assembly 30, and improves the efficiency of assembly 10. Moreover, it should be appreciated that the tapered roller bearing assembly 24 and member 20 cooperatively and substantially absorb radial and axial loads generated by the rotating rotor assembly 30, thereby substantially reducing the loads and stress imparted upon the crankshaft 14, and substantially preventing the stress-related fracture, failure, and/or deformation of the crankshaft 14. Furthermore, the presence of seal 22 substantially prevents any oil and/or lubricant from escaping or leaking from engine block 12 and into assembly 10, and/or undesirably contacting the components of assembly 10. Additionally, the relatively radially "tight" and abutting engagement between bearing assembly 24, member 20, crankshaft 14, and rotor assembly 30 substantially eliminates "slop", "rotor wobble and vibration", and vibrational losses associated with the relatively "loose" dimensional fit of prior starter-alternator assemblies. The "integration" of seal 22 into support member 20 also provides a longitudinal "space-saving" feature, as the need for separate oil retention components to prevent oil from leaking from engine block 12 is eliminated.

It is understood that the invention is not limited by the exact construction or method illustrated and described above but that various changes and/or modifications may be made without departing from the spirit and/or the scope of the inventions.

What is claimed is:

1. An apparatus for use in combination with an assembly of the type having an engine block, a crankshaft, a rotor assembly including a hub disposed substantially within the center of said rotor assembly, and a stator assembly which is operatively disposed around said rotor assembly, said apparatus comprising:

a support member which is fixedly coupled to said engine block, said support member including an outer annular surface upon which said stator assembly is fixedly secured and an inner annular surface;

a piloting portion, which is integrally formed with said hub, and which is adapted to engage said crankshaft, said engagement being effective to axially align said rotor assembly with said crankshaft; and a bearing assembly which is coupled to said inner annular surface of said support member and which abuttingly engages said hub, said abutting engagement being effective to center said support member and said stator assembly with respect to said rotor assembly, thereby aligning said rotor assembly within said stator assembly.

2. The apparatus of claim 1 wherein said engine block comprises an aperture through which said crankshaft extends and through which a certain amount of oil flows, said apparatus further comprising:

a generally circular seal which abuttingly engages said inner annular surface of said support member and said crankshaft, said seal being effective to substantially prevent said certain amount of oil from leaking from said engine block.

3. The apparatus of claim 2 wherein said bearing assembly comprises a tapered roller bearing assembly.

4. The apparatus of claim 1 wherein said bearing assembly is press-fitted to said inner annular surface of said support member.

5. The apparatus of claim 1 wherein said hub comprises an outer annular surface having a peripherally disposed channel, said apparatus further comprising an o-ring which is operatively disposed within said channel.

6. The apparatus of claim 1 wherein said seal is press-fitted to said inner annular surface of said support member.

7. The apparatus of claim 1 wherein said bearing assembly comprises a fully sealed and pre-lubricated bearing assembly.

8. An apparatus for aligning an electric machine assembly within a vehicle of the type having an engine block and a crankshaft, said crankshaft having an end portion with an outer annular surface, said electric machine comprising a stator assembly and a rotor assembly which are separated by a certain gap, said apparatus comprising:

a support member which is fixedly coupled to said engine block, said support member includes a first outer lip portion upon which said stator assembly is fixedly secured and an inner lip portion;

a hub on which said rotor assembly is fixedly disposed, said hub having a peripherally disposed ridge which axially projects from said hub, said ridge having an inner annular surface which abuttingly engages said outer annular surface of said end portion of said crankshaft, said abutting engagement being effective to axially align said rotor assembly with said crankshaft; and a bearing assembly which is coupled to said inner lip portion of said support member and which abuttingly engages said rotor assembly, said abutting engagement being effective to center said support member and said stator assembly with respect to said rotor assembly, thereby forming said certain gap.

9. The apparatus of claim 8 wherein said gap is less than 0.4 millimeters in length.

10. The apparatus of claim 8 wherein said electric machine comprises a starter-alternator.

11. The apparatus of claim 8 wherein said hub includes an outer annular surface, and wherein said hub further comprises an annular channel formed within said outer annular surface, and an o-ring which is disposed within said channel, said o-ring being effective to frictionally engage said bearing assembly.

12. The apparatus of claim 8 wherein said bearing assembly is a tapered bearing assembly.

13. The apparatus of claim 8 wherein said support member includes an oil seal which is coupled to said inner lip portion.

14. A method for installing a electric machine within a vehicle of the type having an engine block and a crankshaft having an end portion which extends from said engine block, said electric machine including a stator assembly and a rotor assembly which is adapted to be separated from said stator assembly by a certain gap, said method comprising the steps of:

providing a support member having a centrally disposed channel;

coupling said stator assembly to said support member;

providing a bearing assembly;

coupling said bearing assembly to said support member and within said channel;

axially aligning said channel of said support member with said end portion of said crankshaft;

moving said support member from a first position in which said support member is remote from said engine block to a second position in which said support member abuts said engine block;

relatively loosely coupling said support member to said engine block;

peripherally disposing said rotor assembly upon a hub member;

disposing a pilot upon said hub member, said pilot being effective to abuttingly engage said end portion of said crankshaft;

axially aligning said hub member with said end portion of said crankshaft; and moving said hub member from a first position in which said hub member is remote from said end portion of said crankshaft to a second position in which said pilot engages said end portion of said crankshaft, said movement being effective to cause said bearing assembly to engage said hub member, thereby automatically causing said stator assembly to be aligned with said rotor assembly and forming said certain gap.

15. The method of claim 14 further comprising the step of:

coupling said hub member to said end portion of said crankshaft.

16. The method of claim 14 wherein the step of coupling said bearing assembly to said support comprises press-fitting said bearing assembly to said support member.

17. The method of claim 14 wherein said engine block comprises a certain amount of lubricating fluid, said method further comprising the steps of:

providing a generally circular seal member; and operatively disposing said circular seal member between said support member and said end portion of said crankshaft, effective to prevent said certain amount of fluid from leaking from said engine block.

18. The method of claim 14 wherein said hub member has an outer annular surface, said method further comprising the steps of:

forming a second channel within said outer annular surface; and disposing an o-ring within said second channel, said o-ring being effective to engage said bearing assembly when said hub member is moved from said first position to said second position.

* * * * *